United States Patent
Kim

(10) Patent No.: US 9,014,141 B2
(45) Date of Patent: Apr. 21, 2015

(54) CARRIER-AGGREGATION-BASED HANDOVER METHOD

(75) Inventor: Jae Heung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 69 days.

(21) Appl. No.: 13/695,168

(22) PCT Filed: Apr. 22, 2011

(86) PCT No.: PCT/KR2011/002919
§ 371 (c)(1),
(2), (4) Date: Jan. 8, 2013

(87) PCT Pub. No.: WO2011/136504
PCT Pub. Date: Nov. 3, 2011

(65) Prior Publication Data
US 2013/0100931 A1    Apr. 25, 2013

(30) Foreign Application Priority Data

Apr. 29, 2010 (KR) .................. 10-2010-0039827
Jun. 17, 2010 (KR) .................. 10-2010-0057550
Aug. 3, 2010 (KR) .................. 10-2010-0074890

(51) Int. Cl.
*H04W 4/00* (2009.01)
*H04W 36/00* (2009.01)
*H04L 5/00* (2006.01)

(52) U.S. Cl.
CPC ........... *H04W 36/0005* (2013.01); *H04L 5/001* (2013.01); *H04L 5/006* (2013.01); *H04W 36/0027* (2013.01)

(58) Field of Classification Search
CPC ........................... H04W 36/0005; H04L 5/001
USPC ........................................................ 370/331
See application file for complete search history.

(56) References Cited

U.S. PATENT DOCUMENTS

2011/0032909 A1* 2/2011 Park et al. ............ 370/332
2012/0002617 A1* 1/2012 Vujcic ................. 370/329
(Continued)

FOREIGN PATENT DOCUMENTS

KR   2008-0016652 A   2/2008
KR   2010-0029056 A   3/2010
(Continued)

OTHER PUBLICATIONS

CATT, "Handover for Carrier Aggregation," 3GPP TSG RAN WG2 Meeting #66bis, R2-093722, 3 pages, (2009).
(Continued)

*Primary Examiner* — Sai-Ming Chan
(74) *Attorney, Agent, or Firm* — Nelson Mullins Riley & Scarborough LLP; Anthony A. Laurentano, Esq.

(57) ABSTRACT

Provided are a method for performing handover in a cellular mobile communication system that supports a carrier aggregation, and a user equipment and a node base (NodeB) using the method. A connection between the user equipment and the NodeB may be maintained and information may be exchanged using a plurality of serving carriers. Before performing the handover, the user equipment may perform measurement with respect to a neighboring NodeB supporting the carrier aggregation, and may provide parameter information to the NodeB in order to support a carrier aggregation function required for the handover. In a handover seamless environment, the continuity of a service may be provided and the performance of the service may be enhanced.

10 Claims, 6 Drawing Sheets

(56) References Cited

U.S. PATENT DOCUMENTS

2012/0076042 A1* 3/2012 Chun et al. .................. 370/252
2013/0079009 A1* 3/2013 Aumann et al. ............. 455/436

FOREIGN PATENT DOCUMENTS

| WO | 2009-085128 A1 | 7/2008 |
| WO | 2009-120286 A1 | 10/2009 |
| WO | 2011/136504 A2 | 11/2011 |

OTHER PUBLICATIONS

LG Electronics Inc., "Handover Execution Using Multiple Carriers," 3GPP TSG-RAN2 Meeting #68, R2-097059, 1 page, (2009).

NEC, "Mobility and Carrier Aggregation Signaling," 3GPP TSG-RAN WG2 #69, R2-101561, 2 pages, (2010).

Nokia Corporation, Nokia Siemens Networks, "RACH and carrier aggregation," 3GPP TSG-RAN WG2 Meeting #68, R2-096844, 3 pages, (2009).

International Search Report for Application No. PCT/KR2011/002919, 5 pages, dated Dec. 27, 2011.

Huawei, Intra LTE-A UE Handover Procedure inter-eNB for CA, Aug. 24-28, 2009, pp. 1-5.

MediaTek, Inc., Handover with Carrier Aggregation, Feb. 26, 2010, p. 1-8.

* cited by examiner

FIG. 6

| 610 | 620 | 630 | 640 |
|---|---|---|---|
| PCC index 611 | Number of CCs 621 | Number of CCs 631 | Number of CCs 641 |
| PCC management info 612 | PCC index 622 | CC index 632 | CC index 642 |
| Number of SCCs 613 | PCC management info 623 | ⋮ | ⋮ |
| SCC index 614 | ⋮ | CC index 632 | CC index 642 |
| ⋮ | SCC index 624 | PCC management info 633 | CC management info 643 |
| SCC index 614 | ⋮ | SCC management info 634 | |
| SCC management info 615 | SCC index 624 | | |
| | SCC management info 625 | | |
| First type CC configuration message | Second type CC configuration message | Third type CC configuration message | Fourth type CC configuration message |

CARRIER-AGGREGATION-BASED HANDOVER METHOD

TECHNICAL FIELD

The following embodiments relate to a method for performing a handover in a cellular mobile communication system supporting a carrier aggregation, and an apparatus using the method.

BACKGROUND ART

In a cellular mobile communication system, a handover method and procedure enables a base node (NodeB) and a user equipment to maintain connection using a single serving carrier and to exchange information. The handover method and procedure may be performed by a procedure that is basically based on connection using the single serving carrier.

A source or serving NodeB providing a service to user equipments may determine a handover with respect to a user equipment that is positioned in a handover region or a handover environment, and may determine a target NodeB based on a measurement result reported by the user equipment, and request the target NodeB for the handover.

A handover request message may include connection information, for example, a Radio Access Bearer (RAB) context that is established with the user equipment.

The target NodeB may review whether it is possible to receive the corresponding user equipment according to a handover request from the source NodeB. When it is possible to receive the corresponding user equipment, the target NodeB may transmit a response message with respect to the handover request.

A handover response message may include a scheduling identifier, that is, a Cell-Radio Network Temporary Identifier (C-RNTI) of the target NodeB for the user equipment to be handed over, radio resource information for a random access, and the like.

The user equipment may receive information associated with the target NodeB together with a handover execution command via the source NodeB. The user equipment having received the information may access the target NodeB. When the connection with the target NodeB succeeds, the user equipment may transmit a handover complete message.

The aforementioned handover method may be suitable for a system that may provide a service using a single serving carrier between the NodeB and the user equipment.

For a NodeB and a user equipment that supports a carrier aggregation using a plurality of carriers, there is a need to introduce an additional operation and control procedure with respect to a source NodeB, a target NodeB, and a user equipment.

DISCLOSURE OF INVENTION

Technical Goals

An aspect of the present invention provides a handover method that may decrease a handover delay in a carrier aggregation environment and maintain a service continuity, and a user equipment and a NodeB using the handover method.

Technical Solutions

According to an aspect of the present invention, there is provided a handover providing method of a source node base (NodeB) and a target NodeB, the method including: receiving, by the source NodeB from a user equipment, a measurement result with respect to component carriers of a neighboring NodeB or the source NodeB; determining, by the source NodeB, the target NodeB; transmitting, by the source NodeB, a handover request message to the target NodeB; transferring, by the target NodeB, a handover request acknowledgement (ACK) message to the source NodeB; and transmitting, by the source NodeB to the user equipment, a handover execution command including a handover parameter.

The handover providing method of the source NodeB and the target NodeB may further include determining, by the target NodeB, component carrier configuration information. The target NodeB may transfer the component carrier configuration information to the source NodeB using the handover request ACK message, and the handover parameter may include the component carrier configuration information.

The component carrier configuration information may correspond to one of single component carrier information, primary component carrier configuration information, and the primary component carrier configuration information and secondary component carrier configuration information.

The handover request message may include a measurement result with respect to component carriers of the target NodeB.

The handover providing method of the source NodeB and the target NodeB may further include determining, by the target NodeB, an uplink access component carrier. The target NodeB may transfer uplink access component carrier information to the source NodeB using the handover request ACK message, and the handover parameter include the uplink access component carrier information.

The handover providing method of the source NodeB and the target NodeB may further include: determining, by the target NodeB, component carrier configuration information of a primary component carrier and a secondary component carrier; and transmitting a component carrier configuration and activation control message to the user equipment.

The component carrier configuration information may include both of a downlink component carrier and an uplink component carrier, or may include only one information.

According to another aspect of the present invention, there is provided a handover method of a user equipment, including: transmitting, to a source node base (NodeB), a measurement result with respect to component carriers of a neighboring NodeB, a target NodeB, or the source NodeB; receiving, from the source NodeB, a handover execution command including a handover parameter; attempting an access to the target NodeB and an uplink synchronization establishment; receiving, from the target NodeB, a response with respect to a resource assignment for an uplink access attempt and a synchronization establishment complete; and transmitting a handover complete report message to the target NodeB.

The handover parameter may include component carrier configuration information.

The handover method of the user equipment may further include: attempting the access to the target NodeB and the uplink synchronization establishment; receiving, from the target NodeB, the response with respect to the resource assignment for the uplink access attempt and the synchronization establishment complete; and transmitting the handover complete report message to the target NodeB.

The handover parameter may include uplink access component carrier information.

The handover method of the user equipment may further include: attempting the access to the target NodeB and the uplink synchronization establishment using a component carrier based on the uplink access component carrier information; completing a response to the access and the uplink synchronization establishment; reporting to the target NodeB about the measurement result with respect to the component carriers of the target NodeB using an uplink radio resource allowed by the target NodeB; and receiving a component carrier configuration and activation control message from the target NodeB.

According to still another aspect of the present invention, there is provided a method of changing a component, the method including: setting a user equipment to measure a mobility management; receiving a measurement result obtained by measuring a radio channel quality with respect to component carriers; determining a handover procedure for changing of a primary component carrier based on the measurement result and a load status of each of the component carriers, and performing a relevant control procedure; transmitting, to a user equipment, information associated with a component carrier to be configured as a new primary component carrier, and commanding a handover execution for changing of the primary component carrier; and exchanging control information with the user equipment using the new primary component carrier.

The component changing method may further include: transmitting, to the user equipment, new primary component carrier information and random access resource assignment information; receiving a random access preamble from the user equipment using the new primary component carrier; and transmitting random access response information to the user equipment using the new primary component carrier.

The handover execution command may include timing advance reference primary component carrier configuration information and pathloss reference primary component carrier configuration information for uplink transmit power setup.

The component changing method may further include transmitting a component carrier configuration message to the user equipment.

The component carrier configuration message may include at least one of a primary component carrier index, control information for management of the primary component carrier, at least one secondary component carrier index, and control information for management of a secondary component carrier.

According to yet another aspect of the present invention, there is provided a method of changing a component, the method including: measuring a mobility management based on a configuration from a serving node base (NodeB); transmitting, to the serving NodeB, a measurement result obtained by measuring a radio channel quality with respect to component carriers; receiving, from the serving NodeB, information associated with a component carrier to be configured as a new primary component carrier; and exchanging control information with the serving NodeB using the new primary component carrier.

The component changing method may further include: receiving, from the serving NodeB, new primary component carrier information and random access resource assignment information; transmitting a random access preamble to the serving NodeB using the new primary component carrier; and receiving random access response information from the serving NodeB using the new primary component carrier.

The component changing method may further include transmitting, to the serving NodeB, a control message indicating a primary component carrier change complete and a secondary component carrier configuration complete.

Effect of the Invention

According to embodiments of the present invention, there may be provided a handover method that may decrease a handover delay in a carrier aggregation environment and maintain a service continuity, and a user equipment and a node base (NodeB) using the handover method.

BRIEF DESCRIPTION OF DRAWINGS

FIG. 6 is a diagram illustrating a configuration of a component carrier configuration or re-configuration message according to an embodiment of the present invention.

BEST MODE FOR CARRYING OUT THE INVENTION

Figure 1:
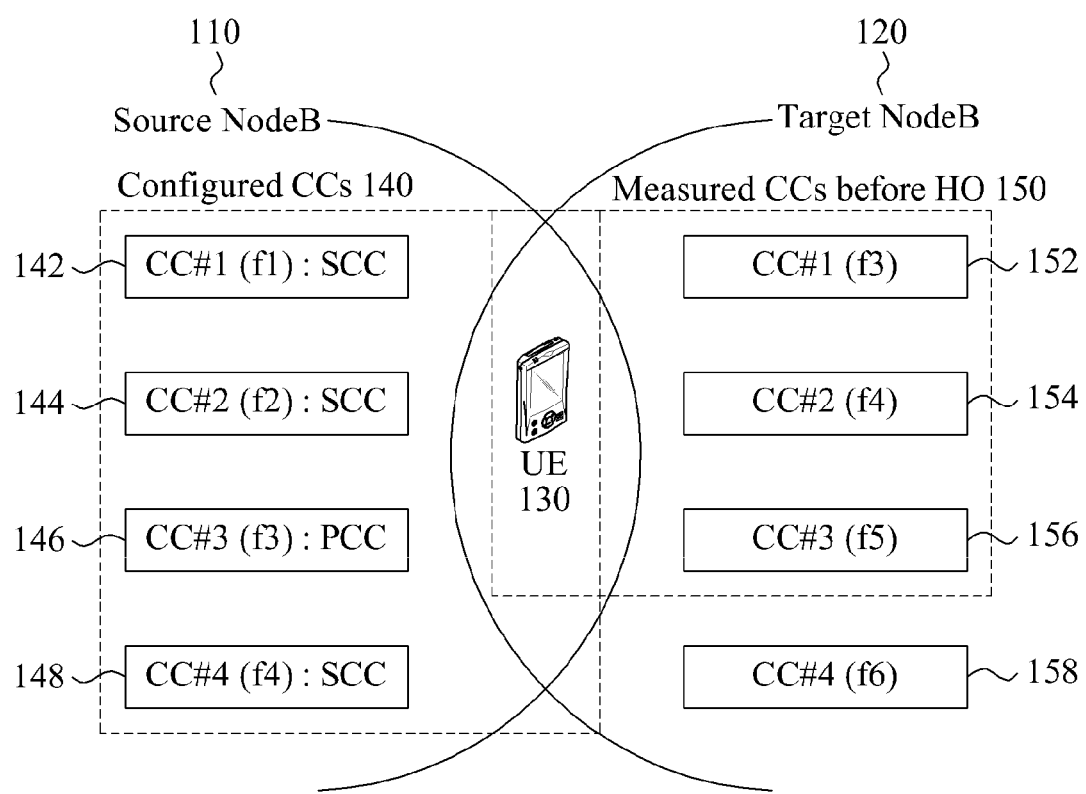
FIG. 1 is a diagram illustrating a handover in a carrier aggregation environment according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a handover in a carrier aggregation (CA) environment according to an embodiment of the present invention.

Each of a source node base (NodeB) 110 and a target NodeB 120 corresponds to a NodeB to support carrier aggregation (CA), and may include a plurality of component carriers (CCs). Here, each of the CCs may operate as a single cell within the same NodeB.

Referring to FIG. 1, CCs of the source NodeB 110 may correspond to configured CCs 140. CCs of the target NodeB 120 may correspond to measured CCs before handover (HO) 150.

The source NodeB 110 may support a CA function by including a plurality of component carriers. The plurality of component carriers of the source NodeB 110 may include CC#1 142 of a frequency f1, CC#2 144 of a frequency f2, CC#3 146 of a frequency f3, and CC#4 148 of a frequency f4.

The target NodeB 120 may support a CA function by including a plurality of component carriers. The plurality of component carriers of the target NodeB 120 may include CC#1 152 of the frequency f3, CC#2 154 of the frequency f4, CC#3 156 of a frequency f5, and CC#4 158 of a frequency f6.

Here, each of the frequencies f1, f2, f3, f4, f5, and f6 may denote a CC of a different center frequency.

Accordingly, the frequencies f3 and f4 may configure CCs of both the source NodeB 110 and the target NodeB 120 as the same frequency carriers. The frequencies f1 and f2 of the source NodeB 110, and the frequencies f3 and f4 of the target NodeB 120 may configure CCs of the source NodeB 110 and the target NodeB 120 as different frequencies.

A user equipment (UE) 130 may belong to the source NodeB 110, and may maintain a connection, for example, Radio Resource Control (RRC) connection, with the source NodeB 110 and may exchange information.

All of the CCs 142 through 148 constituting the source NodeB 110 may be configured in the UE 130.

The UE 130 may control a portion of or all of the configured CCs 140 to be activated or deactivated based on an amount of data to be exchanged, a load status of the NodeB 110, and a load status of each of the CCs 142, 144, 146, and 148 of the NodeB 110.

The UE 130 may configure, as a primary component carrier (PCC), one of activated CCs configured for control signaling exchange, and may configure remaining CCs as secondary component carriers (SCCs).

The source NodeB 110 and the UE 130 enable control signaling, Radio Link Failure (RLF), resource assignment for a random access procedure, and the like to be performed via the PCC.

In the case of supporting a CA function using a plurality of carriers, a threshold for measurement of a separate radio channel quality may be set for PCC change and SCC change between CCs configured or activated in the predetermined UE 130. Here, the SCC change may include addition or deletion of the SCC.

Accordingly, the source NodeB 110 may set and control the UE(s) 130 to perform measurement with respect to each of the configured CCs 140 within the source NodeB 110, and to report the measurement result.

When a radio channel quality measurement result, for example, a channel quality indicator (CQI) of each of the CCs 140 measured and reported by the UE(s) 130 satisfies a threshold criterion used or required for the PCC or SCC change, the source NodeB 110 may control configuration of the PCC or the SCC to be changed for each UE 130 using a control message.

Also, in order to support a UE mobility function, the source NodeB 110 may set and control the UE 130 to measure and report CCs of neighboring NodeBs having the same frequency or a different frequency in addition to the CCs 142, 144, 146, and 148 of the source NodeB 110.

When the UE 130 is determined to be present in a handover region due to a deteriorated channel quality of a CC 142, 144, 146, or 148 of the source NodeB 110 based on the measurement result of the UE 130, or when a channel quality of a CC(s) of a neighboring NodeB satisfies a threshold criterion set for handover based on the channel quality measurement result of CC(s) of the source NodeB 110 and the target NodeB 120, the source NodeB 110 may determine the handover is to be performed.

When the source NodeB 110 determines the handover is to be performed based on the result measured and reported by the UE 130, the source NodeB 110 may determine the target NodeB 120 based on the measurement result.

In this example, a target NodeB determination may indicate that a single CC 152, 154, 156, or 158 is selected from the CCs 150 of the target NodeB 120.

The source NodeB 110 may request the target NodeB 120 for handover with respect to the corresponding UE 130. In this instance, the source NodeB 110 may provide a radio channel quality measurement result associated with the CCs 152 through 158 of the target NodeB 120 measured and reported by the UE 130, in addition to a capability of the corresponding UE 130, RAB information, and the like.

The radio channel quality measurement result transmitted from the source NodeB 110 to the target NodeB 130 may include information that is provided to help the target NodeB 120 to configure a CC for the corresponding UE 130.

Radio channel quality measurement information associated with the CC(s) may be expressed in a form of a signal to interference ratio (SIR), a signal to interference plus noise ratio (SINR), a reference signal received power (RSRP), a reference signal received quality (RSRQ), a received signal strength indicator (RSSI), and the like.

Using the radio channel quality measurement result measured and reported by the UE 130, the source NodeB 110 may provide CC configuration list information including at least one CC that may be configurable as a PCC and/or an SCC by the target NodeB 130.

The target NodeB 120 receiving a handover request from the source NodeB 110 may determine a PCC and an SCC(s) in the target NodeB 120 for the corresponding UE 130 based on UE information, the measurement result with respect to the CCs 150 of the target NodeB 130 or CC configuration list information, and a load status including control signaling with respect to each of the CCs 152, 154, 156, and 158 of the target NodeB 120.

The target NodeB 130 may transmit, to the source NodeB 110, information used for the handover and configuration information associated with the PCC and the SCCs, using a response message with respect to the handover request.

Information used for the handover may include the following parameters:

1) Scheduling identifier, for example, a C-RNTI in the target NodeB 120

2) Information for encoding, for example, security key information

3) CC configuration information, for example, single CC information, PCC configuration information, at least one SCC configuration information 4) Radio resource information for random access (RA) to the target NodeB 120, for example, an RA CC, an RA radio resource position, RA preamble index information, and the like.

A method different from the aforementioned method may be applied. For example, only PCC configuration information in CC configuration information of the target NodeB 120 may be notified to the source NodeB 110 using a handover request response message before the handover is performed by the UE 130. After the UE 130 completes connection with the target NodeB 120, the target NodeB 120 may configure the SCC by transmitting SCC configuration information using a separate control message. Accordingly, in this case, the target NodeB 120 may transfer, to the source NodeB 110, only configuration information associated with a single CC 152, 154, 156, or 158.

Specifically, regardless of whether the source NodeB 110 provides radio channel quality information associated with the CC(s) 150 of the target NodeB 120 or configurable CC list information, the target NodeB 120 may transmit, using a handover control message, PCC configuration information that is notified to the UE 130 to be handed over using the source NodeB 110.

After the UE 130 to be handed over attempts an access to the PCC of the target NodeB 120 that is transferred via the source NodeB 110, the target NodeB 120 may configure SCCs.

The source NodeB 110 having received, from the target NodeB 120, a response message with respect to the handover request may transmit, to the UE 130, a control message commanding the handover. The source NodeB 110 may notify the UE 130 about parameter information used for the handover that is transferred from the target NodeB 120.

The UE 130 having received the handover execution command from the source NodeB 110 may attempt an access to the target NodeB 120 based on the transferred handover parameter information. The UE 130 may complete connection establishment with the target NodeB 120 and transmit a message indicating that the handover is successfully completed.

In a CC of the target NodeB 130 for which the UE 130 may perform RA in order to attempt the access to the target NodeB 120, the following methods may be employed based on information transferred via the source NodeB 110:

1) Method of receiving information indicating a RA CC and access the target NodeB 120

2) Method of accessing a radio resource of a corresponding uplink (UL) CC using downlink (DL) CC and UL CC linkage information included in system information of the target NodeB 120 when single CC information is transferred and the CC information indicates only DL CC 3) Method of verifying an UL PCC and attempting an access using PCC configuration information set and transferred by the target NodeB 120

After connection with the UE to perform the handover is set up, the target NodeB 120 may perform an SCC activation procedure by transmitting a control message for activating SCCs based on PCC and SCC configuration information that the target NodeB 120 has notified to the UE 130 via the source NodeB 110.

When the target NodeB 120 does not transfer SCC configuration information before the handover, the target NodeB 120 may perform an SCC configuration and activation procedure after the connection is set up between the target NodeB 120 and the UE 130

For the above SCC activation procedure, the target NodeB 120 may use a CC measurement result additionally received from the UE 130, and may transmit separate control information to perform additional measurement.

Figure 2:
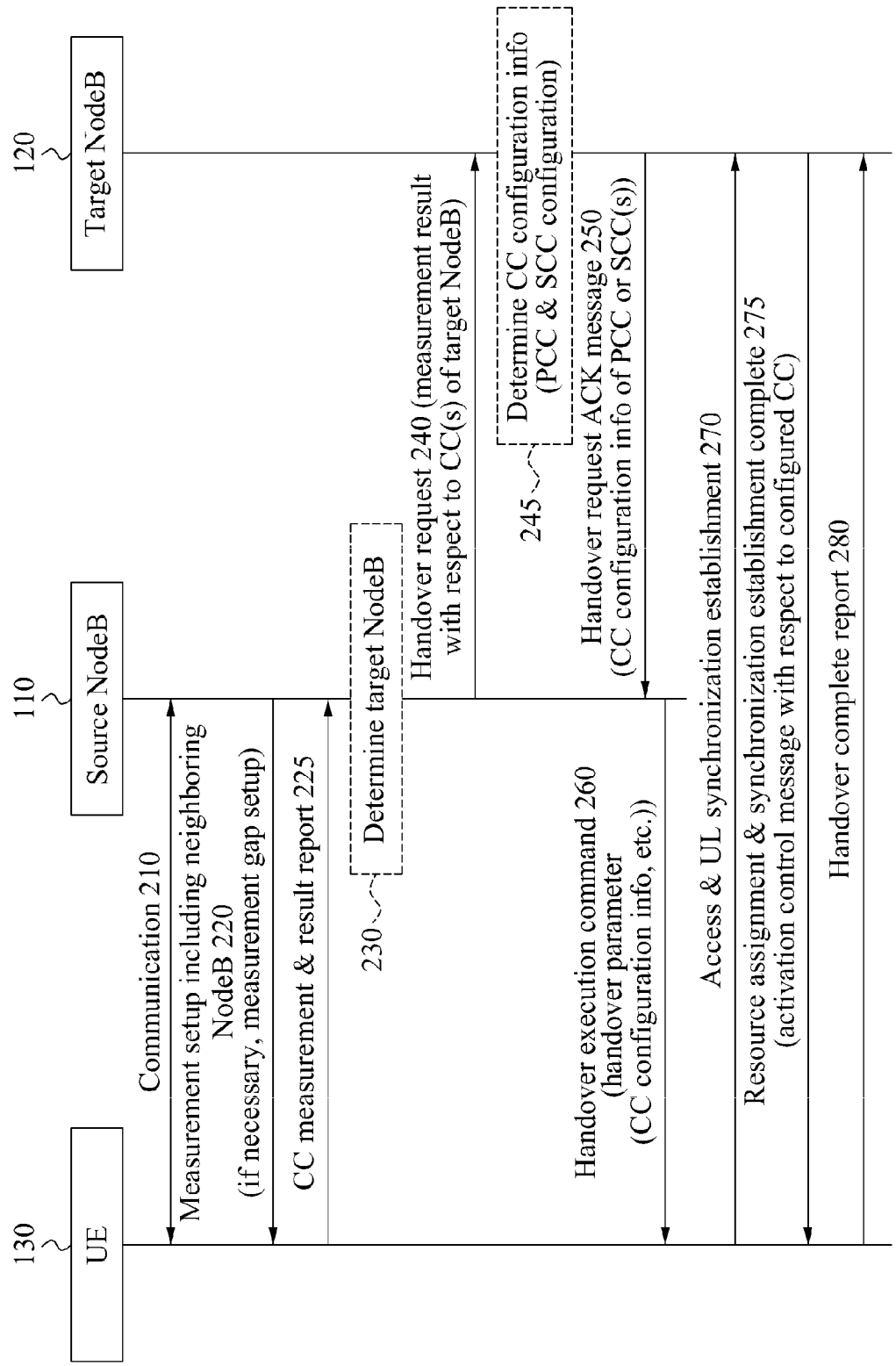
FIG. 2 is a diagram illustrating a message transmission procedure that is configurable using a handover method according to an embodiment of the present invention.

FIG. 2 is a diagram illustrating a message transmission procedure that may be configurable using a handover method according to an embodiment of the present invention.

In operation 210, a UE 130 and a source NodeB 110 may communicate with each other.

In operation 220, the source NodeB 110 may set the UE 130 to measure a CC by including a neighboring NodeB.

If necessary, the source NodeB 110 may set up a measurement gap.

In operation 225, the UE 130 may measure CCs of the neighboring NodeB, for example, the source NodeB 110 or a target NodeB 120, and may report to the source NodeB 110 about a measurement result.

In operation 230, when a handover is determined to be required, the source NodeB 110 may determine the target NodeB 130.

In operation 240, the source NodeB 110 may transmit a handover request message to the target NodeB 120.

The source NodeB 110 may include, in the handover request message, the measurement result with respect to the CC(s) of the target NodeB 120 and thereby transfer the handover request message to the target NodeB 120.

In operation 245, the target NodeB 130 may determine CC configuration information as one of the following 1) through 3):

1) Information associated with a single CC
2) PCC configuration information
3) PCC configuration information and information associated with at least one SCC configuration In operation 250, the target NodeB 120 may transfer CC configuration information such as CC configuration information of PCC or SCC(s) to the source NodeB 110 using a handover request acknowledgement (ACK) message.

In operation 260, the source NodeB 110 may transmit a handover execution command to the UE 130.

The source NodeB 110 may include, in the handover execution command, a handover parameter such as CC configuration information and the like, and thereby transmit the handover execution command to the UE 130.

In operation 270, the UE 130 receiving the handover command may attempt an access to the target NodeB 120 and UL synchronization establishment.

In operation 275, the target NodeB 120 may respond a resource assignment with respect to UL access attempt and a synchronization establishment complete.

In the above response, the target NodeB 120 may also transmit an activation control message with respect to CC(s) configured by the target NodeB 120.

Also, the target NodeB 120 may separately transmit the activation control message with respect to the CC(s) configured by the target NodeB 120.

In operation 280, the UE 130 may transmit a handover complete report message to the target NodeB 120.

Regardless of that the target NodeB 120 makes a request or does not make a request in operation 275, the UE 130 may additionally report a measurement result with respect to a CC of the target NodeB 120.

A measurement result message may allow an UL radio resource that may be assignable or available by the target NodeB 120 in operation 275.

In this case, before or after transmitting the handover complete report message of operation 280, the UE 130 may transmit the measurement result with respect to the configured CC(s) together with the handover complete report message using the UL radio resource allowed by the target NodeB 120. The UE 130 may transmit an activation message with respect to the CCs configured by the target NodeB 120 after receiving the additional measurement result, instead of transmitting the activation message in operation 275.

Figure 3:
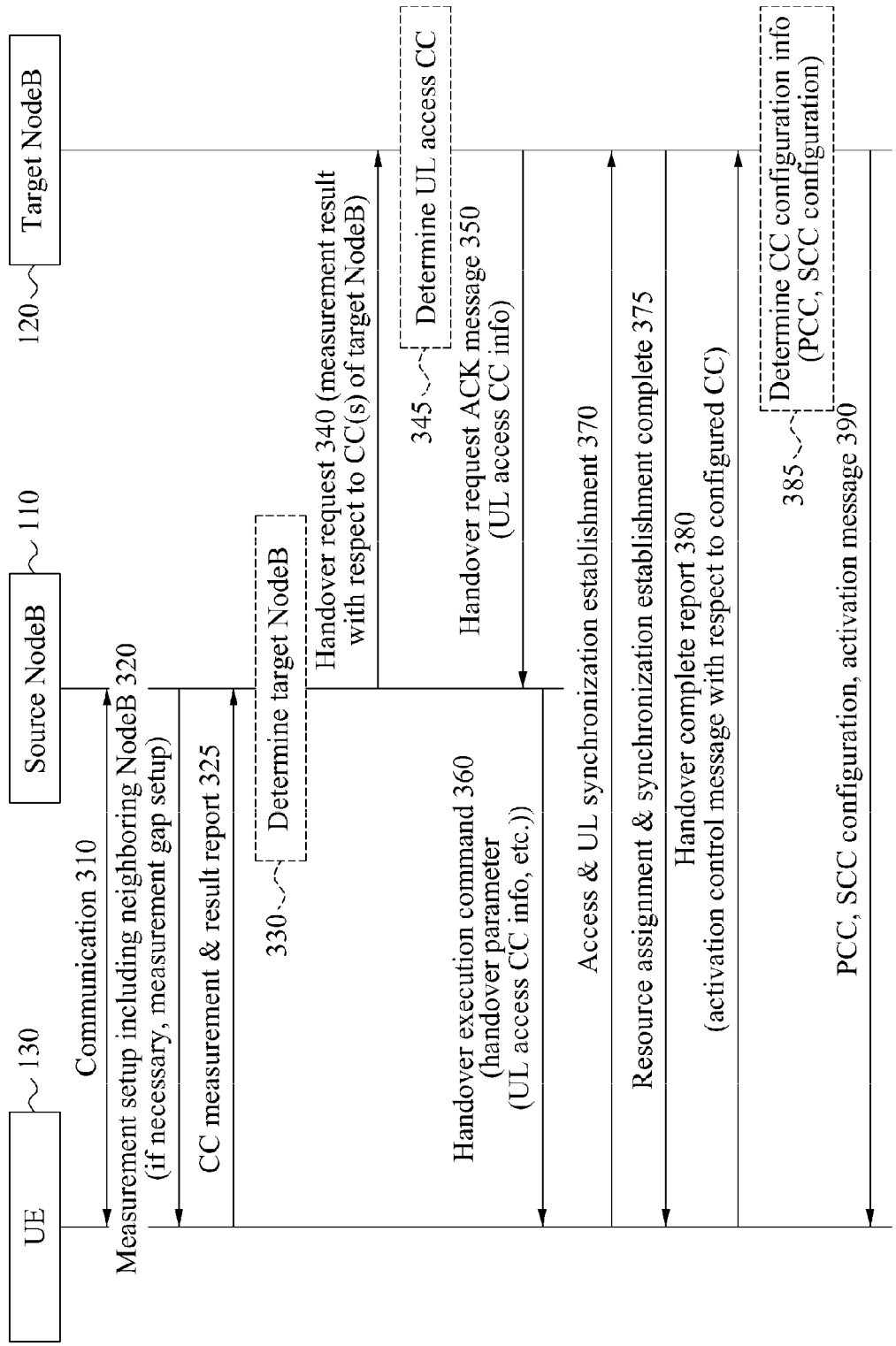
FIG. 3 is a diagram illustrating a message transmission procedure that is configurable using a handover method according to another embodiment of the present invention.

FIG. 3 is a diagram illustrating a message transmission procedure that may be configurable using a handover method according to another embodiment of the present invention.

Even though the handover method of FIG. 3 is similar to the handover method described above with reference to FIG. 2, configuration with respect to CCs of the target NodeB 120 may be determined after handover. Accordingly, an example of the message transmission procedure that may be configurable to be different from the message transmission procedure of FIG. 2 will be described.

Operations 310, 320, 325, 330, 340, 345, 350, 360, 370, 375, and 380 of FIG. 3 may correspond to operations 210, 220, 225, 230, 240, 245, 250, 260, 270, 275, and 280 of FIG. 2, respectively. Accordingly, further detailed description related thereto will be omitted here and a difference between corresponding operations will be described.

Unlink the target NodeB 120 determines CC configuration information in response to the handover request of the source NodeB 110 of operation 240 of FIG. 2 in operation 245, the target NodeB 120 may determine only a CC required when the UE 130 sets up connection with the target NodeB 120 in response to the handover request of the source NodeB 110 of operation 340 of FIG. 3 in operation 345.

In operation 350, the target NodeB 120 may transfer, to the source NodeB 110, UL access CC information according to the above determination using a handover request ACK message.

In operation 360, the source NodeB 110 may transmit a handover execution command to the UE 130.

The source NodeB 110 may include, in the handover execution command, a handover parameter such as UL access CC information and the like and thereby, transmit the handover execution command to the UE 130.

In operation 370, the UE 130 receiving the handover command may attempt a UL synchronization establishment and an access to the target NodeB 120 using a corresponding CC based on the UL access CC information.

In operation 375, a response to the access and the UL synchronization establishment may be completed.

In operation 380, together with a handover complete report message, or after transmitting the handover complete report message, the UE 130 may report to the target NodeB 120 about a measurement result with respect to CC(s) of the target NodeB 120 using the UL radio resource allowed by the target NodeB 120.

In operation 385, the target NodeB 120 receiving the measurement result may determine CC configuration information of PCC and SCC(s), and the like.

In operation 390, the target NodeB 120 may transmit, to the UE 130, a CC configuration control message and activation control message. Here, the CC may include the PCC and the SCC.

The target NodeB 120 may separately configure a CC configuration control message and an activation control message and thereby, may transmit each thereof to the UE 130 using a separate radio resource.

In the above description, the CC configuration procedure and the activation procedure may be controlled using a separate control message.

For example, the CC configuration procedure may use an RRC control message and the activation procedure may use a Media Access Control (MAC) control message.

However, when the separate activation procedure or the MAC control message for activation is absent, the target NodeB 120 may assign a resource based on scheduling information with respect to CCs that are configured using the CC configuration procedure, and may transmit information. The UE 130 may also be controlled to receive DL information transmitted from the target NodeB 120 by monitoring scheduling information, and to transmit information using UL assignment information assigned by the target NodeB 120.

For the above operation, the target NodeB 120 may control the UE 130 to measure and report a DL channel with respect to the configured CCs, and may determine whether scheduling with respect to the configured CCs is available using a corresponding measurement result.

As described above, CC configuration information transferred by the target NodeB 120 via the source NodeB 110 may configure only DL CCs, or may express both DL CCs and UL CCs. When configuring only the DL CCs, UL CCs corresponding to respective DL CCs may be acquired using system information of the target NodeB 120, or may be acquired using a separate control message.

Here, the measurement result with respect to CCs measured and reported by the UE 130 may indicate only measurement information associated with the DL CCs.

A method of applying a handover procedure may be employed for PCC change between CCs within a NodeB supporting a CA, instead of supporting handover between NodeBs.

In a cellular mobile communication system based on an orthogonal frequency division multiple access (OFDMA) system, synchronization establishment and maintenance of UL physical layer may be required to secure the orthogonality between UEs in UL.

However, in the case of supporting a CA function using a plurality of CCs, the one timing advance (TA) information may be applied alike to the plurality of CCs based on distance between center frequencies of CCs.

Specifically, when the distance, that is, a difference between the center frequencies is not great, the source NodeB 110 or the target NodeB 120 may generate TA information for UL synchronization establishment based on a single CC, for example, a PCC among a plurality of CCs configured in the UE 130, and may notify the UE 130 about the generated TA information. In this case, even though a transmission time in all the configured and activated CCs is updated and transmitted using corresponding TA information, the UE 130 may maintain the orthogonality between UEs 130 in the UL.

Accordingly, when using the above property, a RA procedure required for UL synchronization establishment may not be required for handover between CCs within the NodeB 110 or 120 changing PCC within the NodeB 110 or 120.

However, for consistency in a system and TA for accurate UL synchronization establishment between the NodeB 110 or 120 and the UE 130, a process of configuring a reference CC may be required.

Also, when the UE 130 sets a transmission power used for transmission to the NodeB 110 or 120, a process of configuring the reference CC may be required in order to set the transmission power based on a pathloss between the NodeB 110 or 120 and the UE 130, or a radio channel environment.

For example, when the PCC or a primary cell is changed, the pathloss or the radio channel environment may vary due to a change in a DL CC. Accordingly, a pathloss reference CC used to determine the transmission power in UL transmission may also be changed.

Accordingly, the NodeB 110 or 120 may notify the UE 130 about information associated with the changed reference CC, or may control the UE 130 to configure the pathloss reference CC based on mapping information of an UL and a DL recognized by the UE 130 using the system information.

Figure 4:
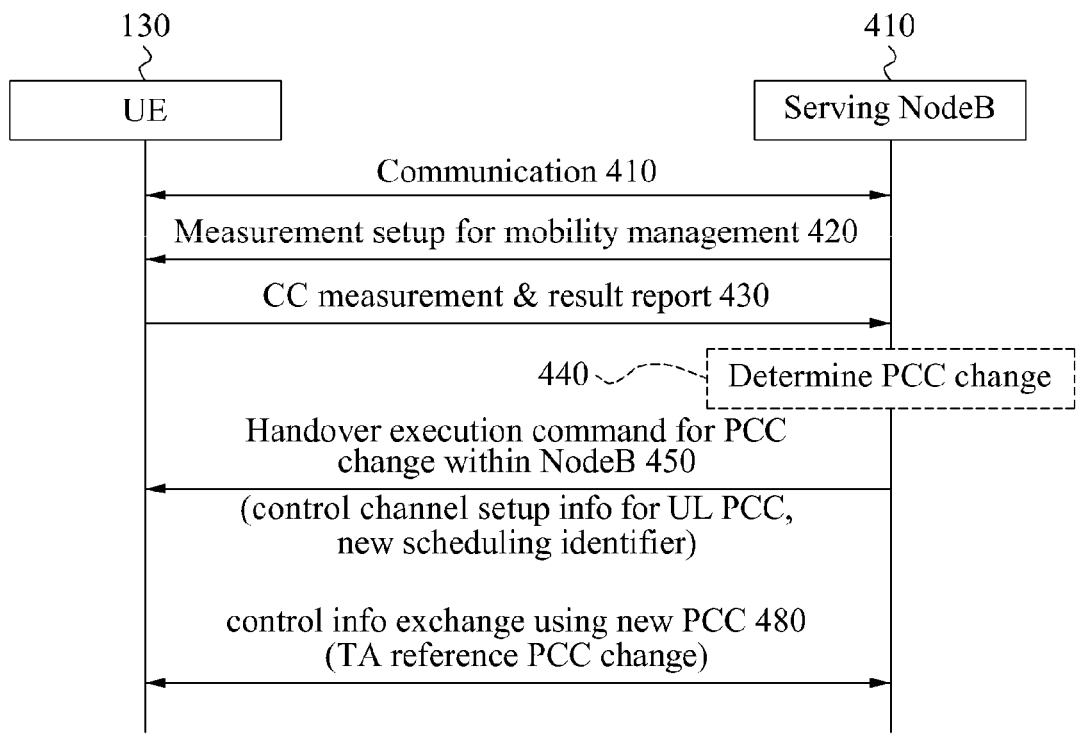
FIG. 4 is a diagram illustrating a procedure for performing handover for component change according to an embodiment of the present invention.

FIG. 4 is a diagram illustrating a procedure for performing handover for component change according to an embodiment of the present invention.

In the present procedure, handover for component change in a serving NodeB 410 may be performed without a RA procedure.

In operation 410, a UE 130 and the serving NodeB 410 may communicate with each other.

In operation 420, the serving NodeB 410 may set the UE 130 to measure a mobility management.

In operation 430, the UE 130 may measure a radio channel quality with respect to all the CCs of the serving NodeB 410 as well as CCs that are configured according to setup of the serving NodeB 410, and may report a measurement result.

In operation 440, the serving NodeB 410 may determine a handover procedure for PCC change, that is, PCC change between CCs within a NodeB based on a load status of each CC and the measurement result reported by the UE 130, and may perform a relevant control procedure.

In operation 450, the serving NodeB 410 may transmit, to the UE 130, information associated with a CC to be configured as a new PCC, and may command the handover for the PCC change within the serving NodeB 410.

The serving NodeB 410 may transmit TA reference PCC and pathloss reference PCC configuration information for UL transmission power setup together with the handover execution command.

In operation 480, the serving NodeB 410 and the UE 130 may exchange control information via the PCC.

The serving NodeB 410 may notify the UE 130 about configuration information associated with a control channel of a UL PCC, for example, a physical uplink control channel (PUCCH).

Also, if necessary, the serving NodeB 410 may change a scheduling identifier, for example, C_RNTI. In this case, the serving NodeB 410 may notify the UE 130 about the scheduling identifier by also changing a relative scheduling identifier according to a use purpose, for example, a semi-persistent scheduling identifier and the like.

The serving NodeB 410 and the UE 130 may also change a reference CC for UL synchronization establishment using a new PCC.

The serving NodeB 410 may transmit the aforementioned pathloss reference PCC configuration information for UL transmission power setup to the UE 130 together with setup information associated with a control channel of UL PCC. Also, the UE 130 may transmit, to the serving NodeB 410, a control message indicating a PCC change complete and/or an SCC configuration complete.

As described above, when a handover procedure for changing a PCC within the serving NodeB 410 is performed without performing a RA procedure, a TA reference CC for an UL physical layer synchronization establishment may be configured as a predetermined configured and activated CC without being limited to the PCC. Accordingly, in operation 480, an existing configured CC may be continuously applied without changing the reference CC with the new PCC.

As shown in FIG. 4, when the PCC is changed by omitting the RA procedure for an initial access to a target serving cell or UL physical layer synchronization configuration in the general handover procedure, a method of assigning and applying a predetermined RA preamble resource may be employed to apply an existing control message.

In this instance, when the serving NodeB 410 includes, in the handover execution command for PCC change, index information of a predetermined RA preamble, for example, a preamble having all the values as '0' or '1' in operation 450, the UE 130 may recognize the PCC change procedure in which the RA procedure for an initial access to a new PCC serving cell is not performed.

As shown in FIG. 4, when the PCC change is performed without a general RA procedure, the new PCC and the UE 130 may employ the following methods 1) through 4) to initiate the access:

1) Method in which the UE 130 is assigned with an UL radio resource by transmitting scheduling resource information to the new PCC using a scheduling request of UL control channel information that is set for a new PCC serving cell in operation 450.

2) Method in which the serving NodeB 410 notifies the UE 130 about UL radio resource assignment information associated with the new PCC serving cell and the UE 130 transmits control information or traffic information required for UL using corresponding information in operation 450.

3) Method in which the new PCC serving cell transmits UL or DL resource assignment information to the corresponding UE 130 whereby the UE 130 initiates transmission and reception with the new PCC serving cell after operations 450 and 480.

4) Method in which the serving NodeB 410 verifies CQI using an assigned radio resource in order to report CQI in UL control channel information set for the new PCC serving cell and transmits UL or DL resource assignment information to the corresponding UE 130, whereby the UE 130 initiates transmission and reception with the new PCC serving cell in operation 450.

Figure 5:
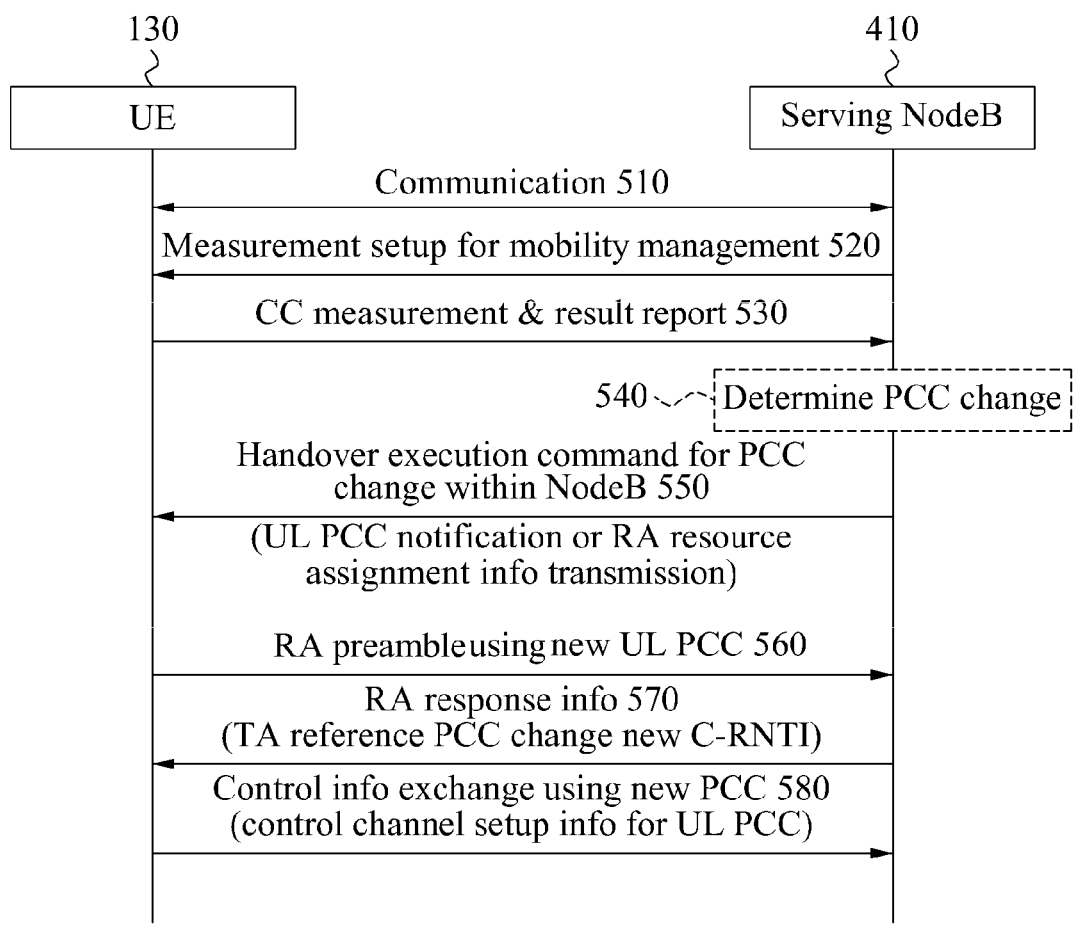
FIG. 5 is a diagram illustrating a procedure for performing handover for component change according to another embodiment of the present invention.

FIG. 5 is a diagram illustrating a procedure for performing handover for component change according to another embodiment of the present invention.

The handover for the component change in a serving NodeB 410 may be performed through a RA procedure.

Operations 510, 520, 530, 540, 550, and 580 of FIG. 5 may correspond to operations 410, 420, 430, 440, 450, and 480 of FIG. 4, respectively. Accordingly, further detailed description related thereto will be omitted here and only a difference between operations will be described.

In operation 550, the serving NodeB 410 may transmit new UL PCC information, RA resource assignment information, for example, RA radio resource position information, an RA preamble index, and the like, and may command a handover execution for the PCC change in the serving NodeB 410.

In this instance, the serving NodeB 410 may transmit TA reference PCC and pathloss reference PCC configuration information for UL transmission power setup together with the handover execution command.

In operation 560, the UE 130 may transmit a RA preamble using a new UL PCC.

In operation 570, the serving NodeB 410 may transmit RA response information using a new DL PCC. In this instance, the serving NodeB 410 may change a reference CC for TA and may assign a new scheduling identifier.

In operation 580, the serving NodeB 410 may transmit control channel setup information of the new UL PCC to the UE 130 and exchange control information via the new PCC.

In this instance, the UE 130 may transmit, to the serving NodeB 410, a control message indicating a PCC change complete and/or an SCC configuration complete.

In the aforementioned PCC change procedure within the same NodeB, the serving NodeB 410 may transmit only DL PCC information in CC information, or may also transmit UL PCC information in operations 450 and 550.

When the serving NodeB 410 transmits only DL PCC information, the UE 130 may recognize mapping relationship between corresponding UL PCC or DL CC and UL CC based on acquired system information. Also, the serving NodeB 410 may set the mapping relationship between the UL PCC or the DL CC and the UL CC using a spate control message.

In addition, in the PCC change procedure within the same serving NodeB 410, the serving NodeB 410 may change a PCC and modify SCC configuration using a CC configuration or reconfiguration message. Specifically, in operations 450 and 550, the serving NodeB 410 may control the UE 130 to perform the PCC change and the SCC reconfiguration by transmitting a CC configuration or reconfiguration message to the UE 130.

The CC configuration or reconfiguration message may include information of the following 1) through 4):

1) PCC index
2) Control information for PCC management
3) At least one SCC index
4) Control information for SCC management Each CC may be classified by defining a CC identifier within the serving NodeB 410. A PCC index in the CC configuration message may indicate a CC identifier selected as a PCC.

The control information for the PCC management may correspond to control information required to configure and maintain the PCC. The control information for the PCC management may include a measurement reference value, for example, an Smeasure value, assignment information of a physical layer resource, for example, UL or DL control information transmission resource, and the like, that maps PCC, CC configuration valid reference information, for example, CC configuration start point, valid interval, and the like, DRX setup information, and the like.

The SCC index indicates an identifier of CC(s) configured as the SCC like the PCC index.

The control information for the SCC management may correspond to control information required to configure and maintain the SCC. The control information for the SCC management may include a measurement reference value, for example, an Smeasure value, assignment information of a physical layer resource, for example, UL or DL control information transmission resource, and the like, that maps CC, CC configuration valid reference information, for example, CC configuration start point, a valid interval, and the like, DRX setup information, and the like. The DRX setup information may be set to be different for each CC and thereby be transmitted.

Also, the CC configuration message may be transmitted so that PCC or SCC configuration may be performed based on a listed CC index order without classifying the PCC index, the SCC index, and the like. That is, a first or a last CC index may be recognized as a PCC configuration index without separate configuration information.

FIG. 6 is a diagram illustrating a configuration of a CC configuration or re-configuration message according to an embodiment of the present invention.

FIG. 6 illustrates four types of CC configuration messages 610, 620, 630, and 640.

The first type CC configuration message 610 may include a PCC index 611, PCC management information 612, a number of SCCs 613, at least one SCC index 614, and SCC management information 615.

The second type CC configuration message 620 may include a number of CCs 621, a PCC index 622, PCC management information 623, at least one SCC index 624, and SCC management information 625.

The third type CC configuration message 630 may include a number of CCs 631, at least one CC index 632, PCC management information 633, and SCC management information 624.

The fourth type CC configuration message 640 may include a number of CCs 641, at least one CC index 642, and CC management information 643.

The aforementioned NodeB 110, 120, or 410 may be replaced with another node, for example, a relay, a small NodeB, a home NodeB, and the like constituting a mobile communication network that supports a CA using a plurality of CCs.

Also, in the aforementioned description, a CC may indicate a transmission frequency constituting a NodeB or a cell. Accordingly, a PCC may be defined as a primary cell and an SCC may be defined as a secondary cell.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of changing a component performed by a target base station, the method comprising:
   receiving a measurement result obtained by measuring a radio channel quality with respect to component carriers;
   determining a handover procedure for changing of a primary component carrier based on the measurement result, and performing a relevant control procedure;
   transmitting, to a user equipment, information associated with a component carrier to be configured as a new primary component carrier, and commanding a handover execution for changing of the primary component carrier; and
   exchanging control information with the user equipment to perform handover with the user equipment using the new primary component carrier, wherein one or more secondary component carriers are in a deactivated state during the handover execution; and
   transmitting an activation control message requesting the user equipment to activate at least one of the one or more secondary component carriers.

2. The method of claim 1, further comprising:
   transmitting, to the user equipment, new primary component carrier information and random access resource assignment information;
   receiving a random access preamble from the user equipment using the new primary component carrier; and
   transmitting random access response information to the user equipment using the new primary component carrier.

3. The method of claim 1, wherein the handover execution command comprises timing advance reference primary component carrier configuration information and pathloss reference primary component carrier configuration information for uplink transmit power setup.

4. The method of claim 1, further comprising:
   transmitting a component carrier configuration message to the user equipment.

5. The method of claim 4, wherein the component carrier configuration message comprises at least one of a primary component carrier index, control information for management of the primary component carrier, at least one secondary component carrier index, and control information for management of a secondary component carrier.

6. A method of changing a component performed by user equipment which is supported carrier aggregation, the method comprising:
   measuring a mobility management based on a configuration from a serving node base (NodeB);
   transmitting, to the serving NodeB, a measurement result obtained by measuring a radio channel quality with respect to component carriers;
   receiving, from the serving NodeB, information associated with a component carrier to be configured as a new primary component carrier; and
   exchanging control information with the serving NodeB to perform a handover procedure with the serving NodeB using the new primary component carrier,
   wherein one or more secondary component carriers are in a deactivated state during execution of the handover procedure; and
   transmitting activation control message requesting the user equipment to activate at east one of the one or more secondary component carriers.

7. A handover method of a user equipment supporting carrier aggregation, comprising:
   transmitting channel quality measurement result with respect to each of component carriers;
   receiving, from a target base station, configuration information about a primary component carrier and one or more secondary component carriers via a source base station;
   configuring the primary component carrier and the one or more secondary component carriers according to the configuration information; and
   performing a handover procedure to establish connection with the target base station, wherein the configured one or more secondary component carriers are in a deactivated state during execution of the handover procedure;
   receiving an activation control message indicating at least one of the configured one or more secondary component carriers from the target base station after the handover procedure; and
   activating the indicated one or more secondary component carriers according to the activation control message.

8. The method of claim 7, wherein the channel quality measurement result includes component carrier configuration list.

9. The method of claim 8, wherein the channel quality measurement result further includes channel quality information of each component carrier.

10. A handover method of a target base station supporting carrier aggregation, comprising:
    receiving channel quality measurement result with respect to each of component carriers, from user equipment;
    determining a primary component carrier and one or more secondary component carriers;
    transmitting configuration information about the determined primary component carrier and one or more secondary component carriers to the user equipment via a source base station; and
    performing a handover procedure to establish connection with the user equipment, wherein the one or more secondary component carriers configured according to the configuration information are in deactivated state during execution of the handover procedure;
    transmitting activation control message requesting the user equipment to activate at least one of the configured one or more secondary component carriers after the handover procedure.

* * * * *